(12) United States Patent
Joniot (10) Patent No.: US 10,173,769 B2
(45) Date of Patent: Jan. 8, 2019

(54) HIGH-ALTITUDE DRONE

(71) Applicant: RIDENGINEERING, Roques (FR)

(72) Inventor: Jaques Joniot, Roques (FR)

(73) Assignee: RIDENGINEERING, Roques (FR)

( * ) Notice: Subject to any disclaimer, the term of this patent is extended or adjusted under 35 U.S.C. 154(b) by 190 days.

(21) Appl. No.: 14/891,153

(22) PCT Filed: May 9, 2014

(86) PCT No.: PCT/FR2014/051078
§ 371 (c)(1),
(2) Date: Nov. 13, 2015

(87) PCT Pub. No.: WO2014/184471
PCT Pub. Date: Nov. 20, 2014

(65) Prior Publication Data
US 2016/0167775 A1    Jun. 16, 2016

(30) Foreign Application Priority Data

May 15, 2013    (FR) ...................................... 13 54355

(51) Int. Cl.
*B64C 27/22*    (2006.01)
*B64B 1/44*    (2006.01)
(Continued)

(52) U.S. Cl.
CPC ................ *B64C 27/22* (2013.01); *B64B 1/40* (2013.01); *B64B 1/44* (2013.01); *B64C 17/04* (2013.01);
(Continued)

(58) Field of Classification Search
CPC ........... B64C 27/22; B64C 17/04; B64B 1/40; B64B 1/44; B64B 1/70
See application file for complete search history.

(56) References Cited

U.S. PATENT DOCUMENTS 3,226,059 A * 12/1965 Paterson ............... B64C 39/022
244/17.17
3,677,660 A * 7/1972 Taniguchi ................ B63H 5/14
415/173.6
(Continued)

FOREIGN PATENT DOCUMENTS

CA    2827210 A1    8/2012
CN    1201745 A    12/1998
(Continued)

OTHER PUBLICATIONS

English translation of Chinese Office Action in corresponding Chinese application No. 201480027821.2, dated Sep. 2, 2016.

*Primary Examiner* — Michael H Wang
(74) *Attorney, Agent, or Firm* — Volpe and Koenig, P.C.

(57) ABSTRACT

The invention relates to a drone comprising: two contra-rotating annular propellers (2, 4) defining a plane therebetween which is referred to as an equatorial plane and is assumed to be horizontal, means for driving the propellers, a load arranged below the equatorial plane, and means (20) for moving the load relative to the equatorial plane, an enclosure referred to as an upper enclosure (6) filled with a gas or a gaseous mixture having a density of less than 1 and arranged essentially above the equatorial plane, and an enclosure referred to as a lower enclosure (8) filled with a gas or a gaseous mixture having a density of less than 1 and arranged essentially below the equatorial plane, the load being placed inside the lower enclosure (8).

14 Claims, 8 Drawing Sheets

(51) Int. Cl.
*B64C 27/20* (2006.01)
*B64C 39/02* (2006.01)
*B64B 1/40* (2006.01)
*B64C 17/04* (2006.01)

(52) U.S. Cl.
CPC ............ *B64C 27/20* (2013.01); *B64C 39/024* (2013.01); *B64C 2201/022* (2013.01); *B64C 2201/027* (2013.01); *B64C 2201/042* (2013.01); *B64C 2201/066* (2013.01); *B64C 2201/101* (2013.01); *B64C 2201/108* (2013.01); *B64C 2201/122* (2013.01); *B64C 2201/123* (2013.01); *B64D 2211/00* (2013.01)

(56) References Cited

U.S. PATENT DOCUMENTS

| | | | | |
|---|---|---|---|---|
| 4,061,293 A | * | 12/1977 | Lo | B64B 1/32 244/26 |
| 4,836,471 A | * | 6/1989 | Piccard | B64B 1/64 244/99 |
| 5,071,383 A | * | 12/1991 | Kinoshita | A63H 27/10 244/26 |
| 5,096,382 A | * | 3/1992 | Gratzer | B63H 1/16 416/189 |
| 5,405,243 A | * | 4/1995 | Hurley | B63H 1/16 416/189 |
| 5,996,933 A | * | 12/1999 | Schier | B64C 27/10 244/17.11 |
| 6,935,963 B2 | * | 8/2005 | Meadows | A63G 31/00 244/26 |
| 7,261,255 B2 | * | 8/2007 | Li | B64B 1/04 244/125 |
| 7,303,166 B2 | * | 12/2007 | Geery | B64B 1/06 244/30 |
| 8,033,497 B2 | * | 10/2011 | Kwok | B64B 1/06 244/5 |
| 8,267,348 B2 | * | 9/2012 | Alavi | B64B 1/62 244/30 |
| 2003/0122033 A1 | * | 7/2003 | Gao | B64C 27/20 244/12.2 |
| 2011/0290937 A1 | * | 12/2011 | Salkeld | B64C 17/04 244/80 |

FOREIGN PATENT DOCUMENTS

| | | |
|---|---|---|
| CN | 2437594 Y | 7/2001 |
| CN | 200967561 Y | 10/2007 |
| CN | 201045076 Y | 4/2008 |
| FR | 1082009 A | 12/1954 |
| FR | 2926787 A1 | 7/2009 |
| GB | 133087 A | 10/1919 |
| WO | 2012107034 A1 | 8/2012 |

* cited by examiner

HIGH-ALTITUDE DRONE

FIELD OF THE INVENTION

The present invention relates to a high-altitude drone. The field of the invention is more particularly that of drones called HALE drones, an acronym for High Altitude Long Endurance.

BACKGROUND

A drone is an unmanned aerial vehicle or UAV. Many drones closely resemble airplanes and are powered like an airplane.

Drones are often used for military purposes and/or for observation operations. The drone is sent over the area to be observed, carrying with it the image capture and transmission equipment necessary to complete its mission. It is known to have drones flying above 10,000 m, for example 20,000 m, and able to remain in the air for more than 24 hours with a payload of one or more metric tons.

Another application of a HALE drone is, for example, to serve as a stratospheric platform. A machine is placed at high altitude in the stratosphere (between about 12 and 50 km in altitude) and remains stationary relative to the ground, similarly to a geostationary satellite but at a much lower altitude. Such a drone can preferably remain in position for several weeks or months. It then serves as a telecommunications relay for example, for telephony and/or for images (television) from terrestrial observation for civilian or military purposes, etc.

Projects of this type exist, but no proposed solution allows maintaining a payload of several hundred kilograms or several metric tons in position above a target for several days.

SUMMARY

The present invention aims to provide a drone, or a stratospheric platform, which can carry enough load to enable, for example, completing an observation task or telecommunications relay task for a period of at least a month.

To this end, the invention provides a drone comprising:
two contra-rotating annular propellers defining a plane therebetween which is referred to as an equatorial plane and is assumed to be horizontal,
means for driving the propellers,
a load arranged below the equatorial plane, and
means for moving the load relative to the equatorial plane.
According to the invention, the drone further comprises:
an enclosure referred to as an upper enclosure, filled with a gas or gaseous mixture having a density of less than 1 and arranged substantially above the equatorial plane, and
an enclosure referred to as a lower enclosure, filled with a gas or gaseous mixture having a density of less than 1 and arranged substantially below the equatorial plane, the load being placed within the lower enclosure.

This original combination provides a drone with reduced power consumption, enabling it to fulfill a long-term mission with a relatively heavy load. The enclosures filled with light gas reduce the energy required to keep the drone and its load aloft. The general structure (contra-rotating annular propellers, placement of enclosures, etc.) provides an optimization that allows remaining in the atmosphere for a long period with no need to recharge.

In an embodiment that is preferred as it provides a very simple and light structure that is still effective, each annular propeller comprises a first annular part, a second annular part of larger diameter than the first annular part, and blades which each connect the first annular part to the second annular part. To provide good stiffness of each set of parts forming a propeller, each blade is advantageously rigidly embedded in the first annular part and second annular part.

Still in the interests of structure simplification and optimization of the weight and energy requirements of the drone, it may advantageously be arranged that the means for driving the propellers comprise at least one shaft positioned in the equatorial plane, rotated by a motor and provided with a gear which meshes with a rack-type structure provided on each of the two annular propellers.

Preferably, the propeller drive means comprise at least one electric motor. Despite the weight of the batteries, electricity is a preferred power source because it is possible to recharge them while aloft by means of solar panels.

In one preferred embodiment, the load is suspended on a rigid pendulum pivoted about two perpendicular axes positioned in the equatorial plane. Operating the pendulum causes the drone to become "unbalanced" and this is utilized to orient the drone as it moves about. It is advantageous if the payload (which can correspond to means for transmitting communications, observation equipment, or other) is also actively used in controlling the movement of the drone.

The upper enclosure is made for example of biaxially-oriented polyethylene terephthalate (also known under the trade name Mylar). The lower enclosure is preferably made of a transparent material.

Because it is light, reliable, and effective, an advantageous manner of connecting the enclosures to the rigid structure of the drone comprising the propellers and drive means, provides that the two enclosures are connected by a substantially spherical net which surrounds them. The rigid structure is then at least partially trapped between the two enclosures.

If electrical energy is used onboard the drone, it is then possible for example to have the upper enclosure covered with photoelectric cells. Such cells can also be provided on the means for moving the load. Batteries can be added to the load. The panels are then located closer to the batteries, optimizing the structure and weight of the drone.

One advantageous embodiment provides that a net connects the two enclosures by surrounding a portion of each of the enclosures that is close to the equatorial plane, and that the portion of each enclosure not surrounded by the net is deformable. Allowing such deformation of the enclosures makes it possible to regulate the pressure inside them. The drone is sometimes illuminated (and heated) by the sun and sometimes is in darkness. The deformable enclosures thus allow adapting to external conditions. In this variant embodiment, to control the deformation of the enclosures, elastic tensioners are arranged inside each enclosure and are attached to the inside thereof.

To help balance the pressures between the two enclosures, a duct for example can be provided to establish communication between the internal volume of the upper enclosure and the internal volume of the lower enclosure. To better manage the pressures inside each enclosure, it is advantageous to place a three-way valve in the duct.

In an alternative embodiment that improves the aerodynamics of the drone according to the invention, the lower enclosure advantageously has a substantially conical area on the side away from the equatorial plane. The drone thus has an aerodynamic shape with a reduced drag coefficient.

BRIEF DESCRIPTION OF THE DRAWINGS

Details and advantages of the invention will be more apparent from the following description, which refers to the accompanying drawings in which:

FIG. 8 is an elevational view of the drone corresponding to FIG. 6, FIGS. 9 and 10 are views similar to that of FIG. 3, respectively for the first configuration and the second configuration of the second embodiment in FIGS. 5 and 6, FIGS. 11 and 12 are respective top views for the first configuration and the second configuration of the second embodiment in FIGS. 5 and 6.

DETAILED DESCRIPTION OF THE PREFERRED EMBODIMENT

In a first embodiment as represented in FIGS. 1 to 4, a drone according to the invention comprises an upper annular propeller 2 and a lower annular propeller 4 forming a set of two contra-rotating annular propellers, an upper enclosure 6, a lower enclosure 8, and a mechanism for driving the propellers.

The two propellers are arranged symmetrically relative to a plane hereinafter called the equatorial plane. It is assumed in the following description that this plane is horizontal. In addition, both propellers are arranged parallel to each other. They are thus spaced apart from each other by a constant distance along the entire periphery of the propellers.

The two propellers have similar structures. A preferred embodiment of the invention provides that the structure of these propellers is very simple. According to one preferred embodiment, an annular propeller comprises blades 10 and an internal annular part 12 and external annular part 14.

The blades 10 are for example in the form of flat vanes. They are oriented so as to be inclined relative to the horizontal (or relative to the equatorial plane), and are regularly distributed over 360°. Each blade is, in a preferred embodiment, embedded at one end in the internal annular part 12 and at the other end in the external annular part 14.

The internal annular part 12 is, for example, an annular part having an I-shaped cross-section to provide high rigidity. The web of the I extends for example substantially vertically (meaning substantially perpendicular to the equatorial plane).

The external annular part 14 in the embodiment shown also has an I-shaped cross-section, but the web of the I is inclined relative to the horizontal. In the illustrated embodiment, the cross-section (FIG. 3) of the two external annular parts 14 (one for each propeller) forms a V with the point oriented towards the interior of the propellers.

Both propellers are held in position by four frames 16 regularly distributed around the periphery of the propellers. Each frame 16 is arranged in a radial vertical plane (relative to the center of the annular propellers). Each frame 16 has a perimeter made for example from a metal profile cut and assembled to form said perimeter as well as a crossbar that sits between the two propellers in the equatorial plane. Each propeller is supported by bearings on the equatorial crossbar and on the perimeter of the frame 16.

The upper enclosure 6 is, for example, approximately hemispherical in shape and has a diameter slightly smaller than the diameter of the internal annular parts 12. It is, for example, made of biaxially-oriented polyethylene terephthalate, better known by the Mylar trademark.

The lower enclosure 8 has a general shape that is symmetrical to the shape of the upper enclosure 6, and for example is also made of Mylar (trademark).

The two enclosures are sealed enclosures filled with a gas lighter than air, for example hydrogen or helium. However, while the upper enclosure 6 advantageously only contains gas, the lower enclosure 8 houses a payload 18 carried at the end of a pendulum 20 suspended from a mechanism described below.

The two enclosures can be connected together and/or to the propeller driving mechanism. A net that is approximately spherical in its general shape may be provided which holds the two enclosures in position relative to one another.

The internal volume of the upper enclosure 6 may be connected with the internal volume of the lower enclosure 8. An air duct (not shown) that crosses the equatorial plane may thus be provided.

If the same pressure is to be maintained in the upper enclosure 6 and lower enclosure 8 at all times, a simple air duct is sufficient. However, it may be advantageous to tolerate a pressure difference and to control it. Then a valve is preferably provided in the air duct, which in one position allows the pressures in the enclosures to come into equilibrium and in another position isolates the internal volume of one enclosure from the internal volume of the other enclosure. More preferably, the provided valve can be a three-way valve, with one channel in communication with the interior volume of the upper enclosure 6, one channel in communication with the interior volume of the lower enclosure 8, and one channel in communication with the outside. It thus becomes possible to release into the atmosphere some of the gas (for example helium) contained in the upper enclosure 6 and/or lower enclosure 8. This can be useful during a drone landing operation for example.

The propeller driving mechanism comprises four motors housed within a central structure 24 that is in the form of two circular cylindrical tubes mounted crosswise in the equatorial plane. Each motor 30 is mounted at the end of a tube 26 and has an output shaft 31 supporting a pinion 32 which meshes with both a rack 33 on a lower edge of the internal annular part 12 of the upper annular propeller 2 and with a rack 34 on an upper edge of the internal annular part 12 of the lower annular propeller 4. The output shaft of each motor is aligned in the equatorial plane with the crossbar of a frame 6. It may be arranged, for example, that this crossbar carries a bearing for a pinion driving the propellers.

The pendulum 20 is hinged at the intersection of the tubes 26. A mechanism is provided to orient the pendulum relative to the tubes 26. In a position referred to as neutral, the pendulum 20 extends vertically and is perpendicular to the tubes 26. Two motors are provided here for orienting the pendulum 20 in two directions, preferably perpendicular. It may be provided, for example, that a motor pivots the pendulum about an axis parallel to one tube 26 (the pendulum then moving in a plane passing through the other tube 26) and another motor pivots the pendulum about an axis parallel to the other tube 26 (causing the pendulum to move in the vertical plane containing the first tube 26).

The four motors at the ends of the tubes 26 rotate the propellers, one propeller in a first direction and the other in the opposite direction. The other two motors, by changing the position of the pendulum relative to the tubes 26, cause an inclination of the tubes 26 relative to the horizontal, with the pendulum 20 tending to remain vertical.

With the pendulum in a neutral position, the four motors driving the propellers will be used to vary the altitude of the drone. When the pendulum is tilted relative to its neutral position, these four motors also allow lateral displacement of the drone.

The annular shape of the propellers provides a large lift surface with a relatively large diameter. The rotation speed (in rpm) of the propellers can thus be relatively low, reducing the power consumption of the motors.

To supply power to the electric motors onboard the drone, batteries are provided. These can be placed on the pendulum 20 with the payload 18. Photovoltaic cells may advantageously be provided, for example on the pendulum 20, to ensure at least partial recharging of the batteries when said cells are exposed to sunlight. Of course, to allow sunlight to reach the cells and also to allow the payload to communicate with the outside, the lower enclosure 8 is preferably transparent.

The second embodiment in FIGS. 5 to 12 has basically the same structure as that described with reference to FIGS. 1 to 4. The main difference between the two embodiments shown relates to the lower enclosure and the upper enclosure. The other elements are similar in both embodiments of the invention presented here and therefore use the same references.

The upper enclosure 36 and lower enclosure 38 in the second embodiment each have a more elongated shape than in the first embodiment in FIGS. 1 to 4. These two enclosures are always arranged symmetrically to the equatorial plane. They may or may not be interconnected by an air duct and/or a valve to balance the pressure between the interior volumes of these enclosures.

As illustrated by the figures, this second embodiment is provided in order to enable two configurations (as well as any intermediate position between these two configurations), respectively shown in FIGS. 5, 7, 9, and 11, and in FIGS. 6, 8, 10, and 12. The first configuration can be called the day configuration for example. In this configuration, the enclosures are fully deployed. During the day the drone is exposed to sunlight which heats the gas contained in the enclosures. The gas expands and therefore "inflates" the enclosures. In the second configuration, called the night configuration, the volume of each enclosure is decreased. In this configuration, the gas in the enclosures is much cooler and occupies a smaller volume (and/or is at a lower pressure).

Figure 1:
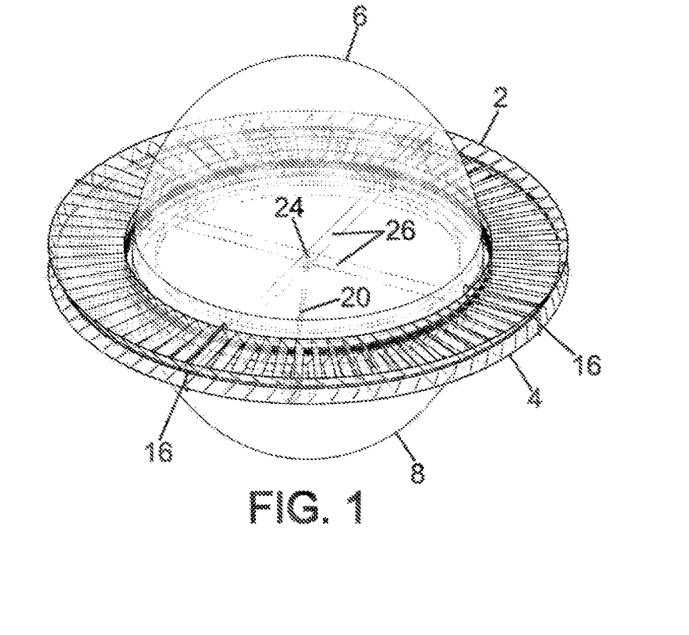
FIG. 1 is a perspective view of a first embodiment of a drone according to the invention.
Figure 2:
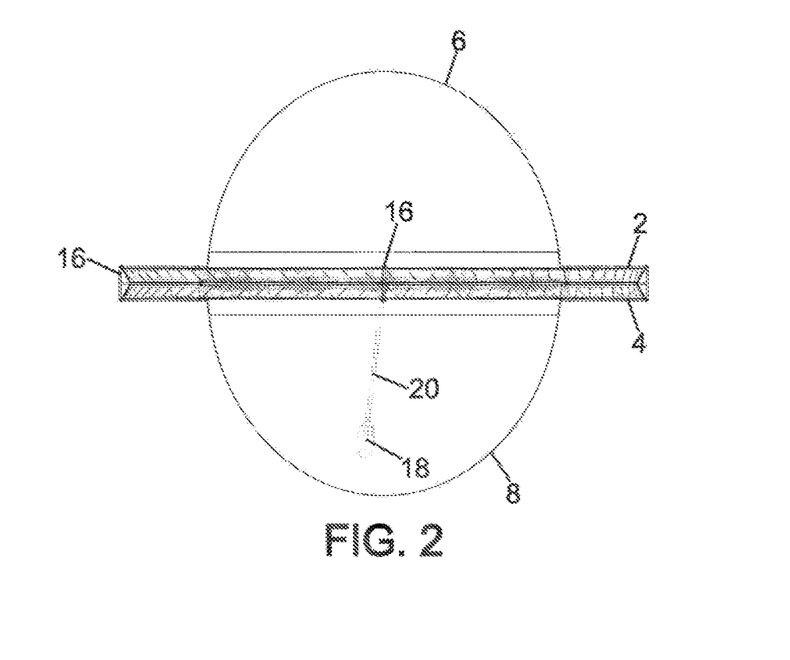
FIG. 2 is an elevational view of the drone of FIG. 1.
Figure 3:
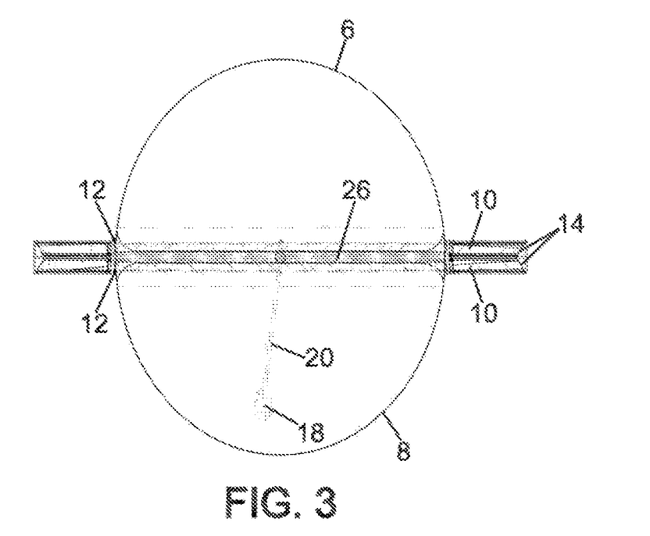
FIG. 3 is a sectional view through a vertical center plane of the drone of FIG. 1.
Figure 4:
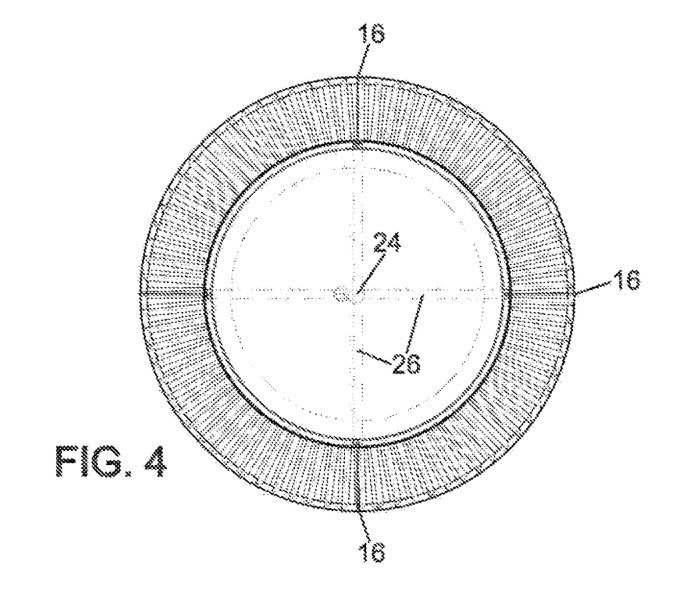
FIG. 4 is a top view of the drone of the preceding figures.
Figure 5:
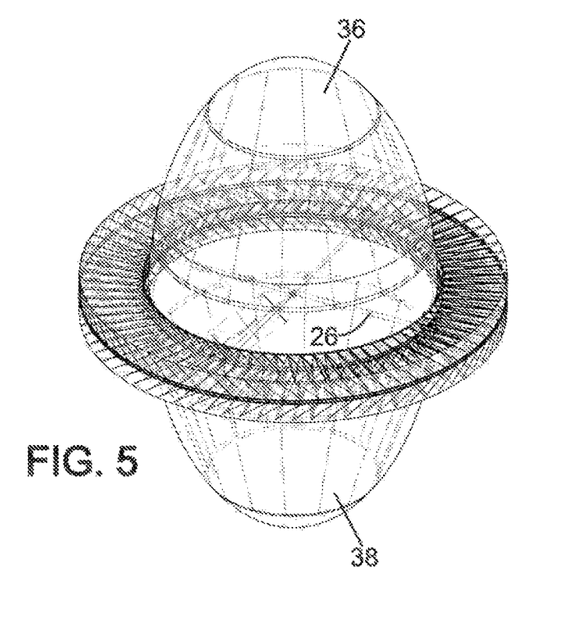
FIG. 5 is a perspective view of a second embodiment of a drone, represented in a first configuration.
Figure 6:
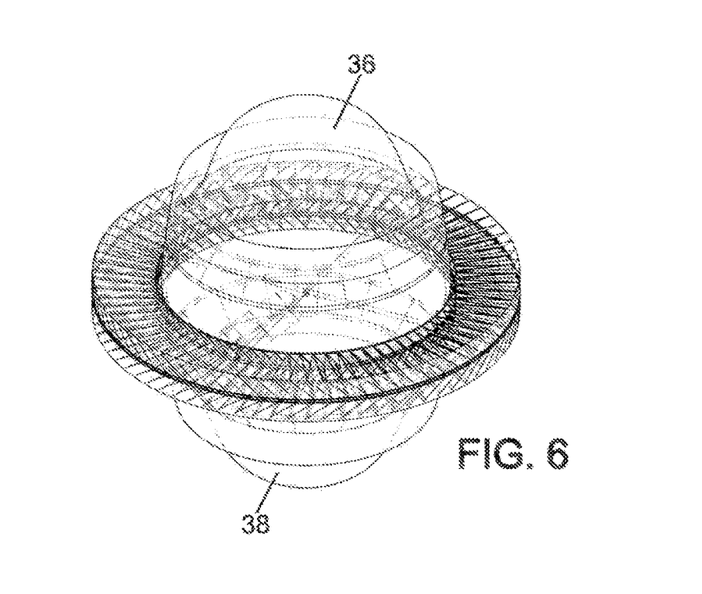
FIG. 6 is a view similar to that of the previous figure, in a second configuration.
Figure 7:
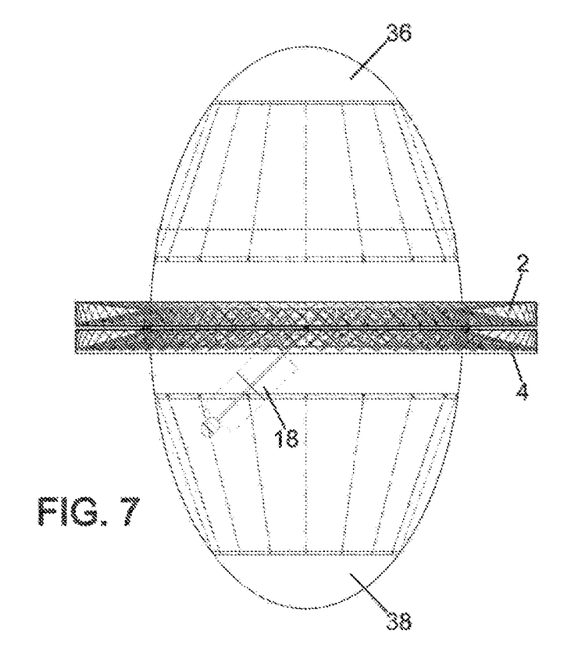
FIG. 7 is an elevational view of the drone corresponding to FIG. 5.
Figure 8:
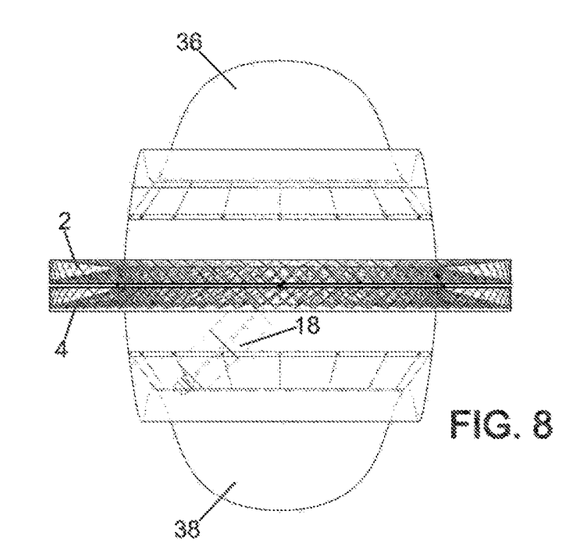
Figure 9:
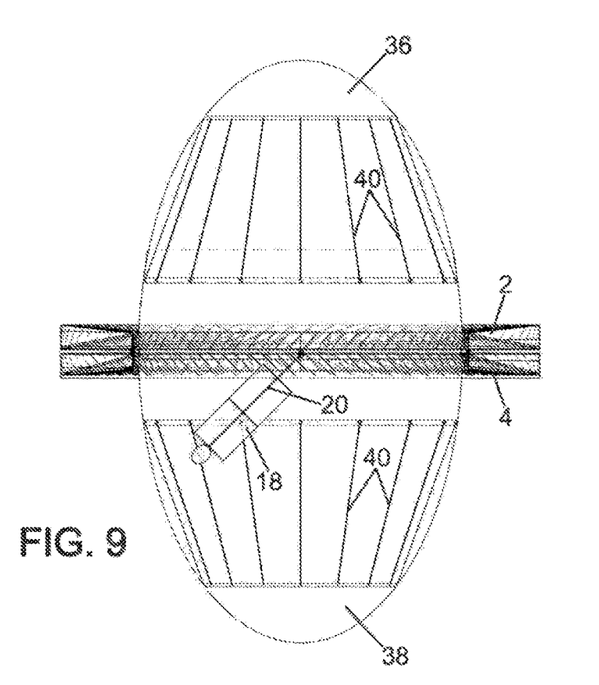
Figure 10:
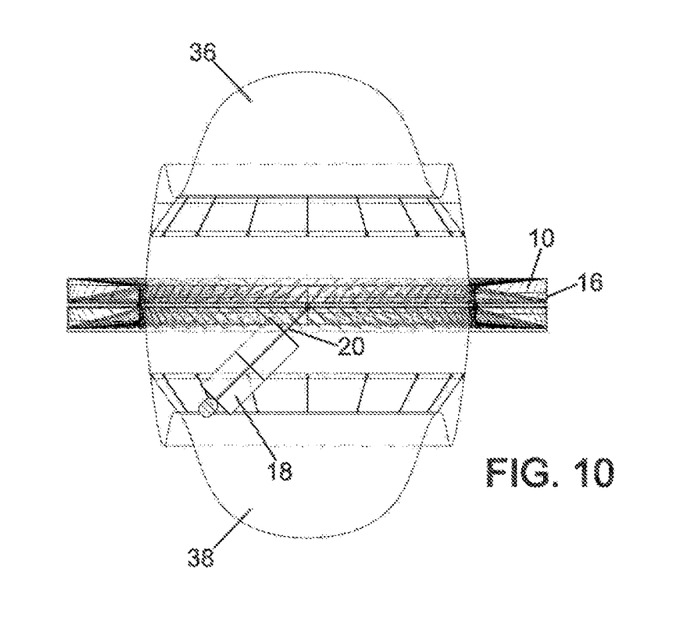
Figure 11:
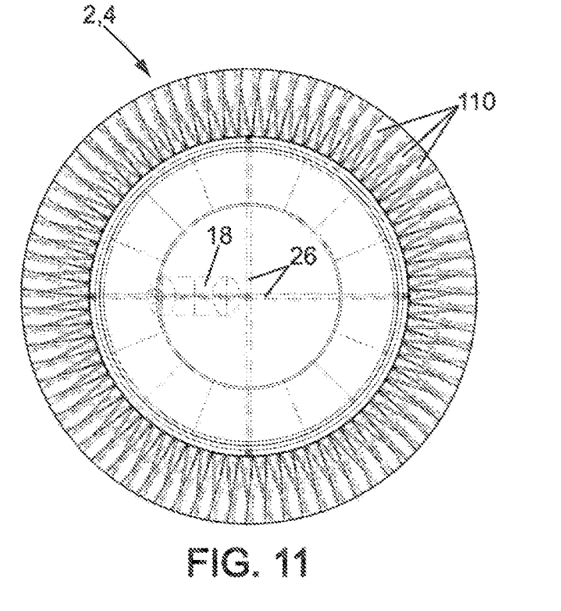
Figure 12:
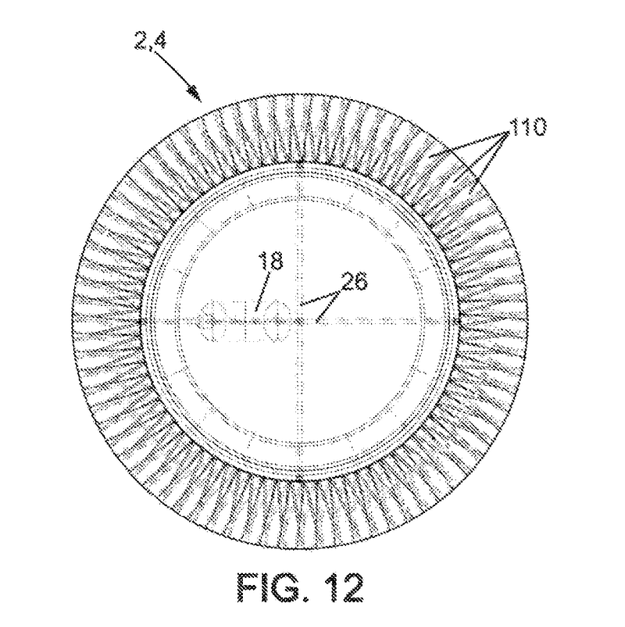

In this second embodiment, instead of having a net entirely surrounding the two enclosures, a net is provided which surrounds the portion of the lower enclosure 38 closest to the equatorial plane and the portion of the upper enclosure 36 closest to the equatorial plane, allowing deformation of the portion of each of enclosure furthest from the equatorial plane. Of course, the deformation must be controlled. Externally, the external net retains the areas closest to the equatorial plane. Internally, as illustrated in FIGS. 9 and 10, regularly distributed elastic tensioners 40 connect points of the enclosure in question located at a first height relative to the equatorial plane to points located at a second height relative to the equatorial plane. Thus, when the gas pressure in an enclosure increases, this causes the elastic tensioners 40 to elongate to the position illustrated in FIG. 9, and when this pressure decreases, the elastic tensioners retract to the position illustrated in FIG. 10.

Figure 13:
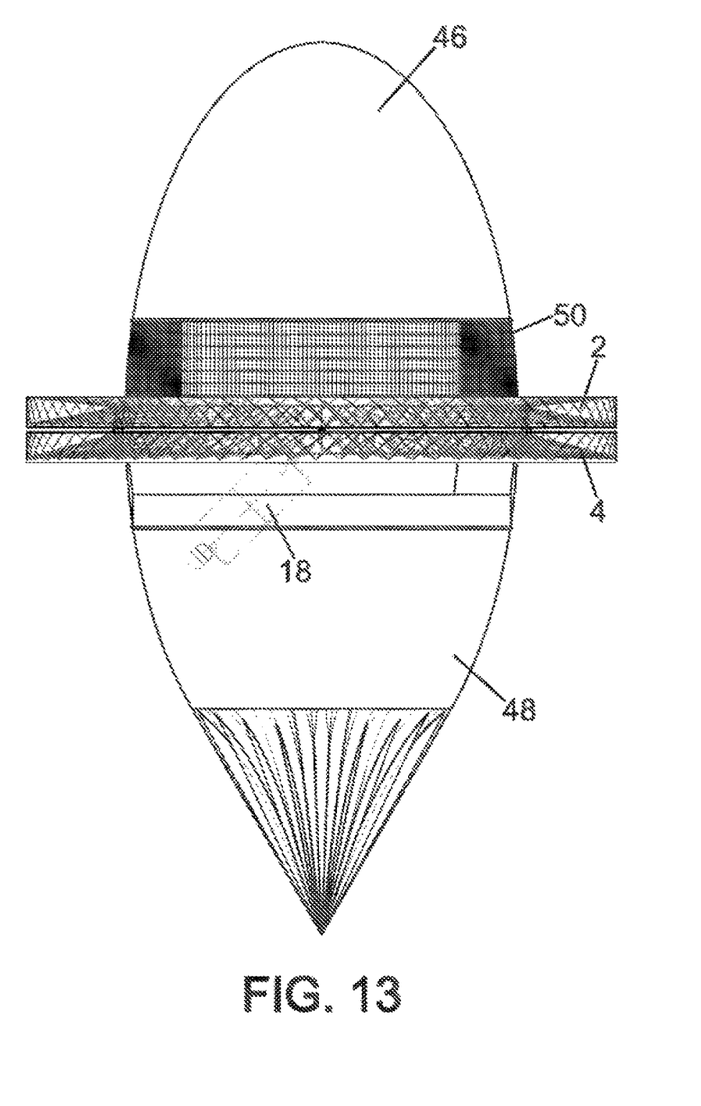
FIG. 13 is an elevational view of another embodiment of a drone according to the invention.
Figure 14:
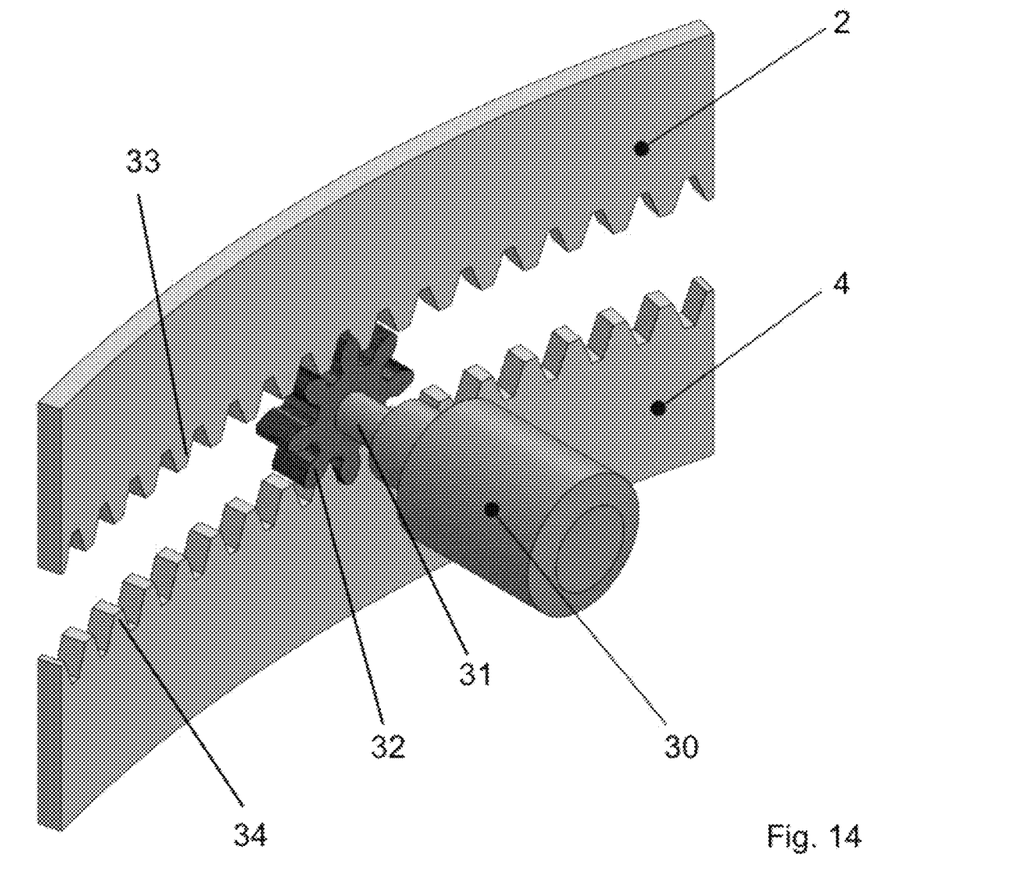
FIG. 14 is a schematic detail of a portion of a drone according to the invention.

FIG. 13 illustrates an alternative embodiment having the same general structure as described above, meaning with a motor assembly comprising an upper annular propeller 2 and a lower annular propeller 4 which are symmetrical to an equatorial plane, an upper enclosure 46 arranged substantially above the equatorial plane, and a lower enclosure 48 arranged substantially below the equatorial plane. The internal volume of the upper enclosure 46 may or may not be in communication with the internal volume of the lower enclosure 48.

The novelty of this embodiment, which can be based on the first embodiment (FIGS. 1 to 4) or the second embodiment (FIGS. 5-12), is that the enclosures have different shapes. As is clearly visible in FIG. 13, the lower enclosure 48 has a conical end, giving the drone a general teardrop shape. Such a shape is aerodynamically favorable and contributes to reducing the power consumption of the device.

Also represented, on a base of the upper enclosure 46, are solar panels 50 which are preferably arranged along the perimeter of the upper enclosure 46. It is preferable to have solar panels 50 on the upper enclosure 48 in order to maximize sunlight exposure, but this must not unbalance the drone.

A drone according to the invention has a light structure that reduces the energy required to keep it airborne and to move it about. In addition, the drive means used, particularly the contra-rotating annular propellers, reduce energy consumption as well because the rotation speeds necessary to keep the drone in place or move it about are low, limiting losses due to friction, etc.

A drone according to the invention may, for example, be positioned above a given location for days or even weeks. It is positioned at an altitude for example of 20 to 25 km. Its altitude can, for example, change by 1 or 2 km (or more or less) between daytime (when the drone is exposed to sunlight) and nighttime (when it is in darkness).

The outer diameter of the propellers may be, by way of non-limiting and illustrative example, about 50 to 100 m. The inner diameter of the propellers is for example about 35 to 75 m.

Tests have shown that the novel structure described above for implementing HALE type drones is also advantageous for smaller drones intended to move about in the atmosphere at altitudes of several hundred meters. Such drones then have a height for example of 2.50 m to 3 m. The outer diameter of the propeller is then for example about 1.50 m to 2 m.

A variety of drones can therefore be considered, having dimensions ranging from a few meters to tens of meters.

Having fixed blades (relative to the annular parts between which they are mounted) greatly simplifies the structure, and thus also reduces its weight.

Because of its simplicity, this drone is easily assembled and disassembled. Even for the larger drones, it is possible to transport a drone (disassembled) by cargo plane. The hardware needed to assemble the drone may, depending on the size of the airplane, be carried in the same hold or aboard another airplane. A drone according to the invention can therefore easily be transported to the site where it will be used.

Of course, the present invention is not limited to the embodiments described and to the variants discussed. It also relates to any embodiment within the reach of the skilled person and within the scope of the following claims.

The invention claimed is:

1. A drone comprising:
two contra-rotating annular propellers (2, 4) defining a plane therebetween which is referred to as the equatorial plane and is assumed to be horizontal,
means for driving the propellers,
a load (18) arranged below the equatorial plane, and
means (20) for moving the load (18) relative to the equatorial plane,
an upper enclosure (6; 36; 46), filled with a gas or gaseous mixture having a density of less than 1 and arranged substantially above the equatorial plane, and
a lower enclosure (8; 38; 48), filled with a gas or gaseous mixture having a density of less than 1 and arranged substantially below the equatorial plane, the load (18) being placed within the lower enclosure (8; 38; 48) wherein the load (18) is suspended on a rigid pendulum (20) pivoted about two perpendicular axes (26).

2. The drone according to claim 1, wherein each annular propeller (2, 4) comprises a first annular part (12), a second annular part (14) of larger diameter than the first annular part (12), and blades (10) which each connect the first annular part (12) to the second annular part (14).

3. The drone according to claim 2, wherein each blade (10) is rigidly embedded in the first annular part (12) and second annular part (14).

4. The drone according to claim 1, wherein the means for driving the propellers comprise at least one shaft positioned in the equatorial plane, rotated by a motor and provided with a gear which meshes with a rack-type structure provided on each of the two annular propellers (2, 4).

5. The drone according to claim 1, wherein the means for driving the propellers (2, 4) comprise at least one electric motor.

6. The drone according to claim 1, wherein the upper enclosure (6; 36; 46) is made of biaxially-oriented polyethylene terephthalate.

7. The drone according to claim 1, wherein the lower enclosure (8; 38; 48) is made of a transparent material.

8. The drone according to claim 1, wherein the two enclosures (2, 4) are connected by a substantially spherical net which surrounds them.

9. The drone according to claim 1, wherein the upper enclosure (6; 36) is covered with photoelectric cells.

10. The drone according to claim 1, wherein a net connects the two enclosures (2, 4) by surrounding a portion of each of the enclosures (36, 38) that is close to the equatorial plane, and wherein the portion of each enclosure not surrounded by the net is deformable.

11. The drone according to claim 10, wherein elastic tensioners (40) are arranged inside each enclosure (36, 38) and are attached to the inside thereof.

12. The drone according to claim 1, wherein a duct establishes communication between the internal volume of the upper enclosure (6; 36; 46) and the internal volume of the lower enclosure (8; 38; 48).

13. The drone according to claim 12, wherein a three-way valve is placed in the duct.

14. The drone according to claim 1, wherein the lower enclosure (48) has a substantially conical area on the side away from the equatorial plane.

* * * * *